Aug. 23, 1966  K. R. GUTHRIE  3,267,967
PIPE REPAIR TOOL
Filed Feb. 18, 1963
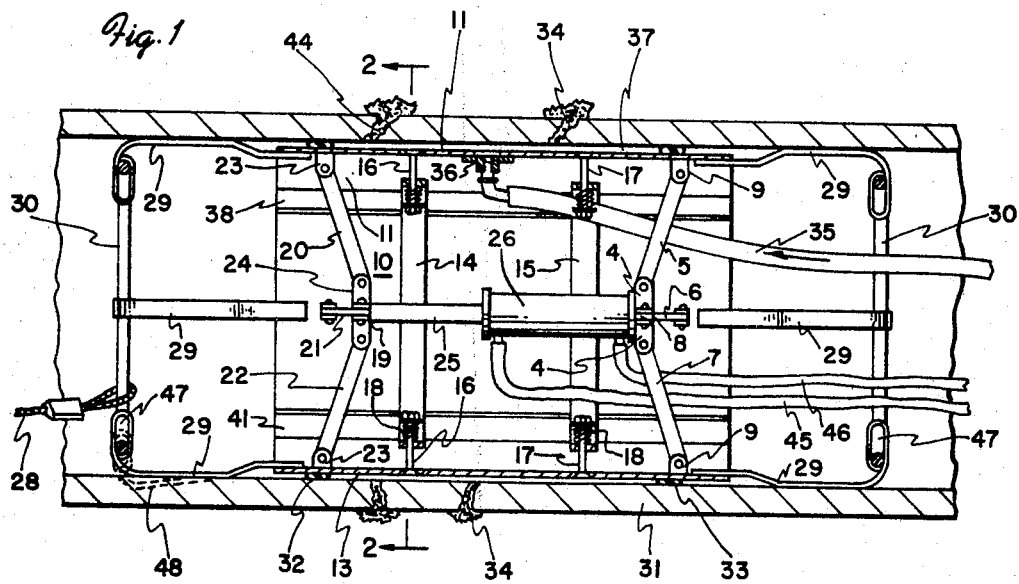
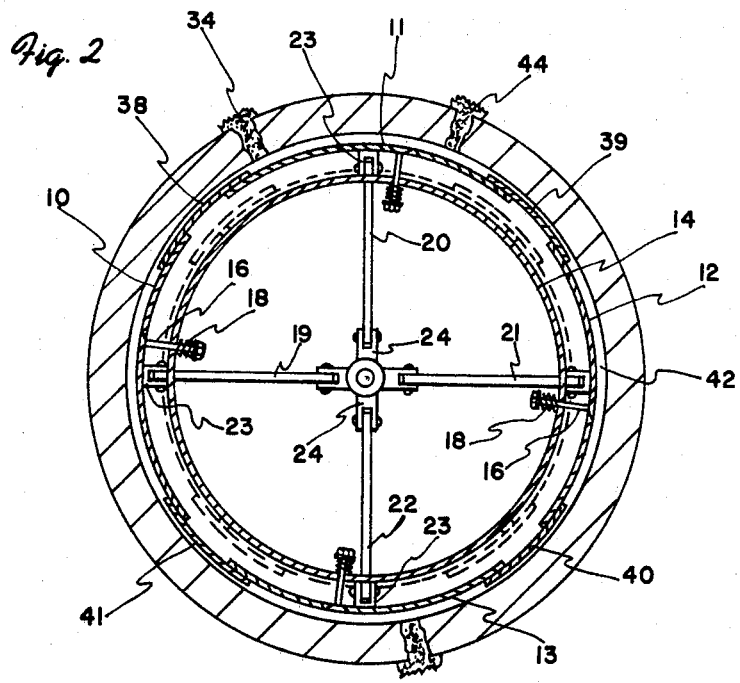
INVENTOR.
KENNETH R. GUTHRIE
BY *Hubert Miller*
ATTORNEY 3,267,967
PIPE REPAIR TOOL
Kenneth R. Guthrie, Newton, Kans., assignor to
The Midland National Bank, Newton, Kans.
Filed Feb. 18, 1963, Ser. No. 259,118
4 Claims. (Cl. 138—97)

This invention is a tool which facilitates the repair of cracks or other leaks in underground pipes, regardless of the material of which the pipes may be made, and without removal or replacement of the leaking pipe sections.

It is the prime object of the invention to provide a tool which makes it possible to form a cylindrical inner liner of settable material at the points of leakage within an underground pipe to completely "wall-off" the cracks or other leaks in the pipe.

The tool is generally cylindrical in shape and is made up of several overlapping longitudinal sections which are complementally arcuate in cross section. Inside the cylinder is arranged a means for moving the various sections radially inward or outward with respect to the longitudinal axis of the cylinder, thus providing a cylinder which is expansible and contractible in exterior diameter throughout its length.

Compressible O-ring seals are mounted on the exterior of the cylinder, one near each of its ends, so that when the cylinder is moved through the interior of a pipe to be repaired and is positioned immediately adjacent a crack or other leak, the cylinder may be expanded to define a cylindrical chamber inside the pipe immediately adjacent its inner wall surface, both ends of the chamber being closed by the respective O-ring seals. A suitable settable material in viscous form is then pumped into the chamber thus formed and allowed to harden. The repair tool cylinder is then retracted to reduce its overall diameter, and is then either withdrawn from the pipe or moved to another point needing repair.

The invention will be more clearly understood when the following description is read in connection with the accompanying drawings, in which:

FIG. 1 is a longitudinal sectional view through a tool embodying my invention, the tool being shown positioned within a pipe to be repaired, and shown in expanded condition; and FIG. 2 is a transverse sectional view of the tool and pipe shown in FIG. 1, and is taken along the line 2—2 thereof.

Referring to the drawings, the tool disclosed includes a plurality of longitudinally extending heavy metal plates 10, 11, 12 and 13, which are identically arcuate in cross section, and arranged to form a hollow right cylindrical shell, as clearly shown in FIG. 2. The opposed plates 10 and 12 have identically arcuate narrower plates 38, 41 and 39, 40 welded to their respective side edges so as to overlap the adjacent side edges of the arcuate plates 11 and 13.

These plate assemblies are mounted on a pair of endless metal rings 14 and 15 by means of radially arranged bolts 16 and 17 which have their heads welded or otherwise rigidly secured to the respective plates 10, 11, 12 and 13. The bolts pass through the respective rings and are freely slidable in apertures therein. The bolts carry springs 18 and washers and nuts, thus allowing the arcuate plates to be moved radially outward from the rings 14 and 15 in paths guided by the bolts 16 and 17. The springs normally serve to maintain the respective plates in retracted positions against the outer surfaces of the rings 14 and 15, as shown by the broken lines in FIG. 2.

A preferred means of extending the plates radially outward on their bolts 16 and 17 consists of a longitudinally centrally positioned hydraulic cylinder 26 having a plunger 25. The outer end of plunger 25 carries a spider having radially outwardly projecting bifurcated arms 24, in this case spaced angularly 90° apart. The remote end of the cylinder barrel is likewise rigidly secured to and carries a similar spider having radially outwardly projecting bifurcated ears 4. Each of the ears 24 is pivotally connected to the inner end of a respective one of links 19, 20, 21 and 22. The outer ends of these links are likewise pivotally connected to respective ones of similar ears 23, one rigidly secured to each of the metal plates 10, 11, 12 and 13, near one end thereof. Likewise each of the ears 4 is pivotally connected to the inner ends of respective ones of like-links 5, 6, 7 and 8, the outer ends of these links being pivotally connected to similar ears 9, one being rigidly mounted on each of the plates 10, 11, 12 and 13.

Thus when plunger 25 is drawn into the cylinder 26 by pressure fluid, the inner ends of the links are moved toward each other and the respective plates 10, 11, 12 and 13 are simultaneously drawn radially inward by the links to positions shown in the dotted lines in FIG. 2. When the plunger 25 is forced outward from its cylinder, the links connected to each of the arcuate plates 10, 11, 12 and 13 force the plates to move radially outward to thus expand the overall diameter of the cylinder throughout its length.

Near each of its ends the described sectional cylinder carries flexible, compressible and stretchable O-ring seals 32 and 33 which snugly fit the exterior of the cylinder when the metal plates are in retracted position. The double acting hydraulic cylinder 26 is fed pressure fluid by a pair of hoses 45 and 46.

At each of its ends each of the metal plates 10, 11, 12 and 13 carry elongated longitudinally disposed leaf type springs 29. The inner end of each spring is welded to its respective plates, and the outer end of each spring is provided with a movement limiting closed loop 47. The outer ends of these springs are held in assembled relationship by endless metal rings 30 threaded through the loops 47. The springs normally assume the position shown in dotted line in FIG. 1, indicated by the numeral 48. The springs are complemental in shape and are symmetrically arranged around the central axis of the cylinder and thus serve as a means of guiding and centering the cylinder within the bore of the pipe as the tool is moved to a point of repair. A cable or rope 28, attached to one of the rings 30, serves to draw the tool through a pipe to a point of leakage.

One of the plates 11 is provided with a pipe fitting 36 (FIG. 1) which serves to connect a hose 35, through which a suitable viscous repair material such as hydraulic cement or epoxy resin may be pumped into the chamber 37 formed between the inner wall surface of the pipe 31 and the outer wall surface of the sectional cylinder, when it is expanded in diameter. This space 37 is sealed at its opposite ends by the O-ring sealing members 32 and 33, which are compressed by the cylinder plates against the adjacent wall surface of pipe 31, as shown.

*Operation*

The tool described is drawn through the pipe to be repaired by means of the cable 28 until it is located immediately adjacent known cracks or leaks in the pipe. Location of such cracks is accomplished by closed circuit television, a common practice. During this drawing operation the sectional cylinder is contracted, and its travel through the pipe is guided by the leaf spring guide members 29, at each of its ends. Any other suitable guide means may, of course, be used. Rollers have served satisfactorily.

When the tool is in proper position pressure fluid is introduced through hose 46 into the cylinder 26, forcing the plunger 25 to move outwardly. The spiders and links previously described thus force each of the metal plates 10, 11, 12 and 13 radially outward into the position shown in FIG. 2, the O-ring seals 32 and 33 being compressed against the inner wall surface of the pipe 31.

The settable repair material is then pumped through hose 35 into the thin cylindrical chamber 37 until that chamber is completely full, and an increase of pressure indicates that the material has been forced outwardly through the cracks 34 and 44, to completely fill them, as clearly shown in the drawing. Pressure is maintained to keep the material in the cracks and a sufficient time is allowed for the material to harden and form a complete cylindrical liner for the pipe. The hardened liner thus formed completely "walls-off" the cracks or other leaks in the pipe at that point.

Pressure fluid is then introduced through the hose 45 to force retraction of the plunger 25. This movement of the plunger causes the links 20-21, 5-6, etc. to individually retract the arcuate plates 10, 11, 12 and 13, simultaneously. The outer diameter of the sectional cylinder is thus reduced throughout its length.

The tool is then drawn by the cable 28 to another point of repair or to a point of removal from the pipe, as desired.

Having described the invention with sufficient clarity to enable those familiar with this art to construct and use it, I claim:

1. A tool for repairing leaks in underground pipes comprising: a hollow right cylindrical shell capable of being expanded and contracted in exterior diameter, said shell comprising rigid circumferentially telescopic shell sections; flexible, compressible and stretchable O-ring seals, one encircling said shell exteriorly near each of its ends; guide means carried by each end of said shell for centering it in the bore of a pipe during its travel therethrough to a point of leakage therein; and remotely controlled means for selectively expanding and contracting said shell in exterior diameter while it is in the pipe.

2. The tool described in claim 1 in which said circumferential telescopic sections comprise a plurality of longitudinally disposed plates which are complementally arcuate in transverse section; means within the shell for maintaining said plates in assembled relationship, said means affording guided radial movement of said plates outward and inward with respect to the longitudinal axis of the shell; and identically arcuate plates secured along the side edges of certain of said first mentioned plates to overlap the spaces between the adjacent side edges of said first mentioned plates when they are moved radially outward.

3. The tool described in claim 2 in which the means for expanding and contracting the shell diameter comprises: a linearly elongatable and contractible remotely controlled power unit disposed along the longitudinal axis of said shell; a plurality of radially disposed links within said shell, one group of such links each having an end pivotally connected to one end of said power unit and each having its opposite end pivotally connected to a respective one of said longitudinally disposed plates near common ends thereof; another group of such links each having one end pivotally connected to the opposite end of said power unit, and each having its opposite end pivotally connected to a respective one of said longitudinally disposed plates near the opposite common ends thereof; whereby when the power unit is extended in length the links connected to each end thereof force the plates to which they are respectively connected to move radially outward with respect to the longitudinal axis of the shell, thus increasing the exterior diameter of the shell throughout its length and placing said stretchable seals under tension, and contraction of the length of the power unit similarly moves the plates radially inward to reduce the exterior diameter of the shell throughout its length, said inward movement being enchanced by the elastic memory of said stretchable seals.

4. A tool for repairing leaks in underground pipes as set forth in claim 2 wherein each said guide means comprises a plurality of axially extending elements, each said element having a relatively free end for contacting said bore and having its other end secured to an end of one of said plates and movable with said plate whereby said guide means are moved outwardly into tight engagement with said bore upon outward movement of said plates.

References Cited by the Examiner

UNITED STATES PATENTS

| | | | |
|---|---|---|---|
| 854,986 | 5/1907 | Weese | 138—89 |
| 1,035,850 | 8/1912 | Black | 166—14 X |
| 1,180,714 | 4/1916 | Hall | 138—97 |
| 1,736,293 | 11/1929 | Van Denburg | 138—97 |
| 2,026,883 | 1/1936 | Gillespie | 138—89 |
| 2,670,799 | 3/1954 | Dobbs | 138—89 X |

FOREIGN PATENTS 212,715   3/1924   Great Britain.

LAVERNE D. GEIGER, *Primary Examiner.*

LEWIS J. LENNY, *Examiner.*

H. ARTIS, *Assistant Examiner.*